United States Patent [19]
Howes

[11] Patent Number: 5,396,578
[45] Date of Patent: Mar. 7, 1995

[54] AUDIO RECORDING AND DISTANCE MEASURING SYSTEM

[76] Inventor: James P. Howes, 122 St. Johns Rd., Wilton, Conn. 06897

[21] Appl. No.: 144,741

[22] Filed: Oct. 28, 1993

[51] Int. Cl.⁶ .................... G11B 25/04; G01B 3/00
[52] U.S. Cl. ..................... 395/2.81; 360/1; 33/760
[58] Field of Search ............ 360/72.1, 72.2, 72.3, 360/1, 46, 32, 53, 51; 33/760, 766, 1 M, 764, 755; 364/562, 561; 369/69; 395/2.81

[56] References Cited

U.S. PATENT DOCUMENTS

| | | | |
|---|---|---|---|
| 3,862,761 | 1/1975 | Conley | 274/14 |
| 4,185,390 | 1/1990 | Tateishi | 33/139 |
| 4,195,348 | 3/1980 | Kakutani | 33/763 X |
| 4,335,411 | 6/1988 | Dischert | 360/72.3 |
| 4,535,415 | 8/1985 | Hird | 365/562 |
| 4,635,144 | 1/1987 | Goto et al. | 360/72.2 |
| 4,636,879 | 1/1987 | Narita et al. | 360/72.2 |
| 4,677,501 | 1/1987 | Saltzman et al. | 360/72.1 |
| 4,747,215 | 5/1988 | Waikas | 33/763 |
| 4,754,346 | 1/1988 | Takagi et al. | 360/72.1 |
| 4,896,432 | 1/1990 | Kang | 33/768 |
| 5,032,937 | 7/1991 | Suzuki et al. | 360/72.3 |
| 5,179,479 | 1/1993 | Ahn | 360/72.2 |
| 5,195,000 | 3/1993 | Suzuki | 360/72.3 |

Primary Examiner—Donald Hajec
Assistant Examiner—Thien Minh Le
Attorney, Agent, or Firm—Melvin I. Stoltz

[57] ABSTRACT

By providing an audio recording and playback system with a measuring device, a unique integrated system is realized which enables users to easily record measured distances and have the measured distances subsequently played back for use. In the preferred embodiment, the audio recording and play back system is constructed in cooperative association with a tape measuring device and is automatically powered whenever the tape is extended from the housing. Then, by pressing an activation switch and orally stating the measurements that have been taken, the orally enunciated information is automatically stored in an associated analog storage array for being subsequently played back whenever required by the user. In this way, an easily employed and particularly convenient system is realized which eliminates the need for manually recording measurements.

16 Claims, 1 Drawing Sheet

AUDIO RECORDING AND DISTANCE MEASURING SYSTEM

TECHNICAL FIELD

This invention relates to distance measuring devices and, more particularly, to spring biased tape measuring devices which enable audible messages to be recorded for subsequent playback by the user.

BACKGROUND ART

Since the introduction of spring loaded, automatically stowable tape measuring devices, these devices have enjoyed substantial commercial success by both professionals and amateurs who perform a wide variety of jobs and duties. In meeting the ever-increasing demand for improvements in such devices, numerous changes have been made over the years for easier spring biased retrieval as well as position locking of the measuring tape in any desired position. However, in spite of the substantial success these products have enjoyed and the substantial effort expended in achieving improvements for these devices, one area has remained completely incapable of resolution, until the present invention.

One of the principal drawbacks encountered by most individuals employing conventional tape measuring devices is the requirement that the individual must either manually or mentally make a record of the measurements being taken. In most instances, individuals must either carry pads of paper and a pen or pencil with them while employing the tape measuring device, so that the measurement being made can be properly recorded. Alternatively, the measurements are written on any available surface for later use by the individual. However, other than attempting to commit a plurality of measurements to memory, some type of manual written record is always needed in order to assure proper recording of every measurement being taken.

As is readily apparent, the use of pencil and paper to record the measurements is extremely cumbersome, particularly when the same person is using the tape measuring device and numerous measurements must be recorded for subsequent use. However, in spite of this problem, no prior art system has been capable of providing any integrated construction wherein measurements can be quickly and easily recorded by the user without resorting to handwritten records on paper or other medium.

Therefore, it is a principal object of the present invention to provide a distance measuring system which is capable of recording a plurality of measurements without requiring the use of pencil, paper, and the like.

Another object of the present invention is to provide a distance measuring system having the characteristic features described above which is easily employed, fully complementary to use of a tape measuring device, and completely eliminates the need for the user to carry extra materials such as paper, pencil, and the like.

Another object of the present invention is to provide an information recording and tape measuring system having the characteristic features described above which is easily activated by the user during the process of measuring a particular dimension and capable of efficiently and effectively recording each and every measurement enunciated by the user.

Another object of the present invention is to provide an information recording and tape measuring system having the characteristic features described above which is capable of easily and conveniently repeating any messages recorded therein in response to user activation for such information.

Other and more specific objects will in part be obvious and will in part appear hereinafter.

SUMMARY OF THE INVENTION

All of the drawbacks and difficulties encountered with prior art measuring devices are completely overcome by the present invention. In order to overcome these drawbacks, the present invention provides a measuring device which incorporates an easily useable information recording and playback system. In employing the teaching of the present invention, a plurality of alternate constructions can be adopted to achieve the desired recording and playback capabilities. In this disclosure, some alternate constructions are discussed. However, these embodiments are intended as examples, and should not be considered as limiting the scope of the present invention.

In the preferred embodiment, circuitry is mounted directly in the housing of a tape measuring device, with the circuit incorporating a mode selection button for selecting either a RECORD mode or a PLAY mode. In addition, the recording system is automatically activated in response to the removal of the measuring tape from the housing. In this way, any time the measuring tape is being used, the recording system is powered and ready for use.

The recording system is preferably powered by replaceable battery means and is constructed for enabling the user to employ the audio recording and tape measuring system in a generally conventional manner. Upon attaining a particular measurement, the user presses an activation button and recites the measurement. The measurement, as recited, is automatically recorded by the audio recording circuitry associated with the audio recording and tape measuring system. Once all of the desired measurements have been taken and recorded, the measurements are then easily played back, upon demand by the user.

In the preferred embodiment, once the system is powered by the withdrawal of the measuring tape from the housing, recording is activated by pressing an activation button mounted on the housing of the audio recording and tape measuring system. In this way, a user employs the audio recording and tape measuring system in the typical manner and, upon determining a desired dimension, merely presses the activation button and states the measurement which has been taken. The audible message enunciated by the user is automatically recorded by the circuitry associated with the audio recording and tape measuring system for later use.

Once the audible message is completed, the user merely removes the activation pressure, causing the circuitry to stop recording. If additional measurements need to be taken, the user operates the system in the same manner, individually recording each and every desired measurement.

Once all of the measurements have been taken, the user moves the RECORD/PLAY switch into the PLAY mode for activating the circuitry to enable all of the recorded measurements stored in the memory of the circuitry to be played, upon demand. With this information, the user is able to make any calculations or diagrams needed, using the precise measurements that have been recorded.

In the preferred embodiment, the reusable information recording system incorporated into the audio recording and tape measuring system of the present invention comprises direct analog storage technology for receiving an audible signal, such as a voice message, and recording the audible message in a message address which forms a part of the circuitry thereof. In addition, in the preferred embodiment, the analog recorded signal is retained until overwritten by another message, when so desired by the user.

The analog storage circuitry may be configured with a plurality of message addresses for recording a plurality of separate messages in separate message addresses. In this way, numerous different measurements can be taken by the user and retained in the recording circuitry until needed by the user. As a result, the user is not required to stop and write down dimensions, while being assured that all of the measurements that have been taken are safely preserved.

Depending upon the size of the tape measuring in it and the amount of information to be retained, the size of each of the message addresses incorporated into the audio recording and tape measuring system of the present invention can be widely varied. Typically, each message address is constructed with the capability of holding information which could be enunciated within between about five seconds and twenty-five seconds. Of course, if special situations exist, where substantially extended memory is required, a greatly enlarged analog storage can be employed.

In addition, in the preferred embodiment, a separate access button is used for specifically recording the desired message in a particular message address. In the preferred embodiment, four separate buttons are mounted on the housing of the tape measuring device, with each button bearing indicia designating one particular message address. In this way, the user is capable of selecting the memory location of particular measurements that have been taken. In addition, the user is also assured that any information which might be lost by recording a new message in a previously used message address will not consist of current information which may still be required.

In the preferred embodiment, whenever the user desires to play the information recorded in any message address, the user first moves the RECORD/PLAY switch to the PLAY position and then selects the message address within which the desired information is retained. When the mode select switch is moved into the PLAY mode, power is connected to the circuit, thereby activating the circuitry. Once the system is powered, the user merely presses an address activation switch which activates the circuitry to retrieve the recorded information from storage and transmit the information through amplifier means and a speaker incorporated into the housing of the audio recording and tape measuring system.

Upon activation, the entire contents of the selected address is transmitted to the speaker for being audibly presented to the user. If desired, the same address can be selected again for repeated audible delivery or, if desired, any other message address can be individually selected by pressing the activation button corresponding to the desired message address. Once selected, the contents of the message address is transmitted to the amplifier and speaker. In this way, the measurements recorded in any of the message addresses can be quickly and easily retrieved by the user whenever the user desires to employ the recorded information.

As discussed above, numerous variations can be made in the implementation of the present invention, without departing from the scope of this invention. In particular, various alternate switch configurations can be employed, such as a system activation switch for both the record mode and the play mode, instead of the activation switch built into the measuring tape for activating the system when the measuring tape is withdrawn from the housing. In addition, although the preferred embodiment employs a separate microphone and a separate speaker, a combined microphone/speaker assembly could be employed with equal efficacy.

Other variations that can be incorporated into the circuitry of the present invention include battery power preservation means which maintains the electronic circuitry in a low battery state until a specific audio level is recognized by the system. Once this audio level has been perceived, the system is automatically activated into a full power mode, in order to record the audible information being received. In this way, power consumption may be reduced if the system is activated for long time periods, without the need for recording during most of the activation time.

In addition, the audio recording system of this invention can be incorporated into distance measuring devices which employ sound or light to determine the distance to any object. In this regard, the signal corresponding to the measured distance is stored directly in the message address or is displayed on a digital display and orally enunciated by the user for being recorded in the desired message address. When desired, the stored information is retrieved from the address and audibly delivered to the user through an amplifier and speaker.

The invention accordingly comprises the features of construction, combination of elements and arrangement of parts which will be exemplified in the construction hereinafter set forth and the scope of the invention will be indicated in the claims.

THE DRAWINGS

For a fuller understanding of the nature and objects of the invention, reference should be had to the following detailed description taken in connection with the accompanying drawings in which:

FIG. 1 is a front elevation view of the audio recording and tape measuring system of the present invention; and FIG. 2 is a schematic functional block diagram showing the circuitry incorporated into the audio recording and tape measuring system of this invention.

DETAILED DESCRIPTION

Figure 1:
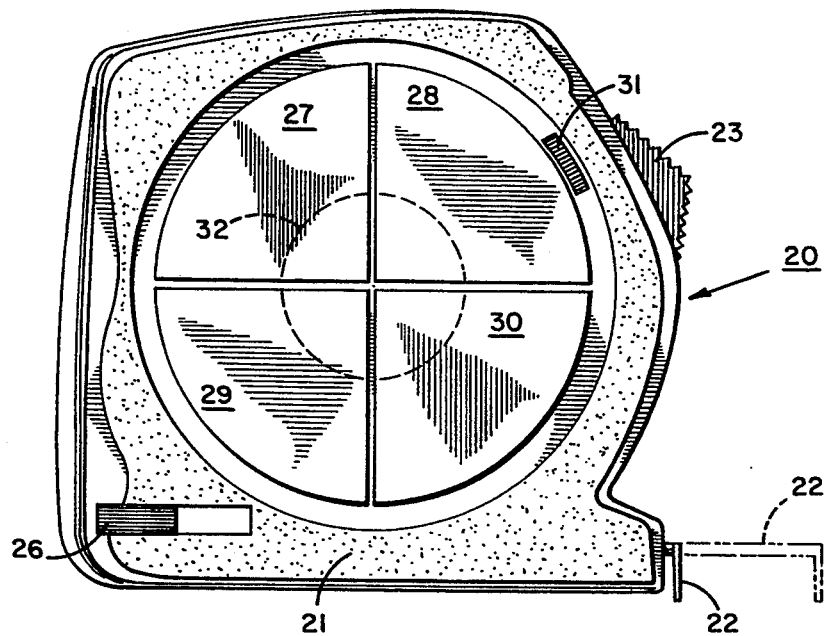
Figure 2:
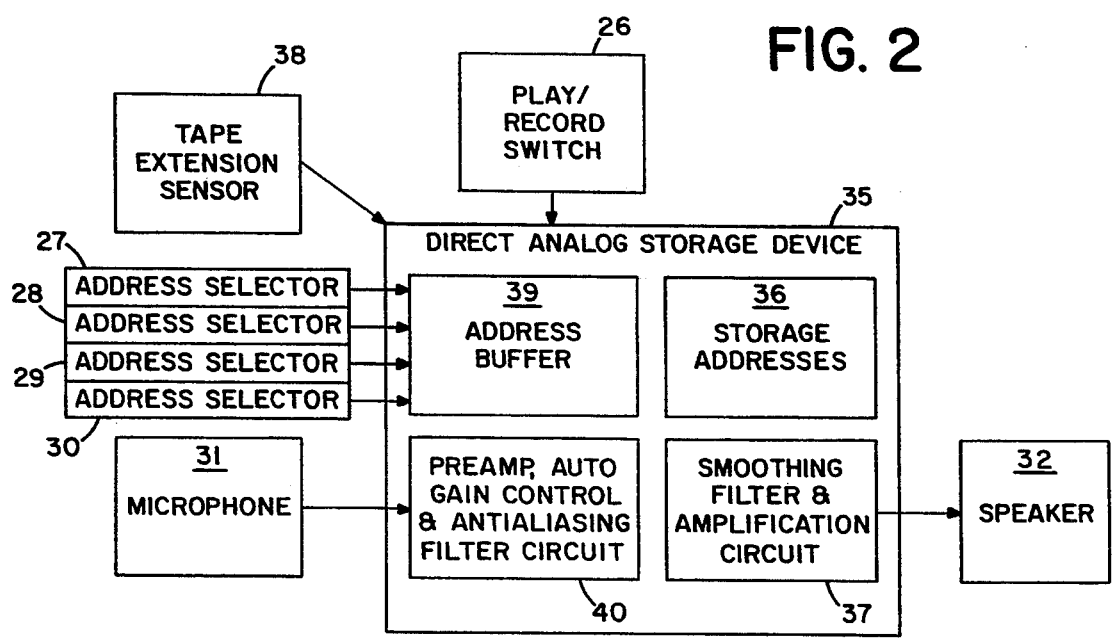

By referring to FIGS. 1 and 2, along with the following detailed disclosure, the overall construction and operation of the present invention can best be understood. Although the best mode for constructing the present invention is disclosed herein, numerous alterations or modifications can be made to the embodiments detailed herein, without departing from the scope of this invention. Consequently, the following detailed disclosure, and the embodiments shown and discussed, are intended as examples for achieving the present invention and are not intended, in any way, to limit the scope of the present invention.

In the present invention, audio recording and tape measuring system 20 comprises a generally conventional configuration, incorporating housing 21, elongated, continuous, measuring tape 22 removably mounted in housing 21, and position locking button 23. As is well known in this art, elongated measuring tape 22 is mounted in housing 21 in a continuous, coiled configuration, with its inside, proximal, terminating edge interconnected to a coiled spring member. In this way, measuring tape 22 is able to be removed from housing 21 and extended to any desired length. Furthermore, upon completion of use, measuring tape 21 automatically returns into housing 21 due to the forces of the spring means mounted therein.

Preferably, audio recording and tape measuring system 20 incorporates position locking button 23, which operates in the conventional manner. In this regard, whenever measuring tape 22 has been withdrawn from housing 21 to a particular desired position, the movement of button 23 from an unlocked position to a locked position causes measuring tape 22 to be retained in the extended position, resisting the spring forces drawing measuring tape 22 into housing 21.

In the present invention, audio recording and tape measuring system 20 also incorporates unique circuitry which is mounted in housing 21, preferably positioned between a side wall of housing 21 and the coiled measuring tape and the internal coiled spring member. By referring to FIG. 2, the overall functional elements incorporated within the circuitry mounted in housing 21 is fully depicted and is detailed below.

As shown in FIG. 1, the preferred embodiment of audio recording and tape measuring system 20 comprises a slide switch 26 which is movable between two alternate positions. Preferably, slide switch 26 is movable between a PLAY position and a RECORD position.

In addition, audio recording and tape measuring system 20 incorporates four easily accessed buttons 27, 28, 29, and 30. In the preferred embodiment, buttons 27, 28, 29, and 30 each comprise push-type, buttons which are activated by merely pressing the button and deactivated by removing the pressing force therefrom.

The construction of audio recording and tape measuring system 20 is completed by preferably incorporating therein a microphone 31 and a speaker 32. Speaker 32 is mounted in housing 21 in a convenient location for enabling the audio output from the circuitry to be easily heard by the user. Similarly, microphone 31 is positioned on housing 21 in a convenient location for receiving the audible messages from the user and enabling the circuitry to record the messages.

In order to provide audio recording and tape measuring system 20 of the present invention with the capability of recording audible messages and replaying the recorded messages whenever desired, housing 21 incorporates the requisite electronic circuitry mounted therein. The preferred circuitry for attaining the present invention is detailed in FIG. 2. By referring to FIG. 2, along with the following detailed discussion, the function and operation of the present invention and its associated circuitry can best be understood.

As shown in the functional block diagram of FIG. 2, the preferred construction of the recording and playback system incorporated into the audio recording and tape measuring system of the present invention comprises message address selector means 27, 28, 29, and 30, each of which are independently connected to a direct analog storage circuit or controller 35. Preferably, storage circuit or controller 35 comprises an integrated circuit, constructed for performing the various functions detailed herein.

As detailed above, message address selectors 27, 28, 29, and 30 preferably comprise buttons or switches mounted to housing 21, with each of the buttons separately connected to controller 35. In this way, controller 35 receives a separate activation signal from each memory zone selector and responds thereto, in a manner detailed below.

Controller 35 is also directly connected with record/play selector 26 for receiving the signal transmitted by record/play selector 26. In response to the signal received therefrom, controller 35 activates the system to function in either the RECORD mode or the PLAY mode, as desired by the user.

The preferred circuitry also incorporates a storage address 39 which are directly connected with a storage array containing storage addresses 36. As discussed above, the preferred embodiment comprises four separate and independent storage addresses 36, each of which are independently accessible by activating a corresponding storage selector, 27, 28, 29 or 30. As is apparent to one of ordinary skill in the art, any number of storage addresses can be employed and each storage address can be of any desired size, in order to provide any desired storage capabilities. In addition, if desired, a single storage address can be used with a single storage selector, if such a construction is preferred.

The preferred circuit of the present invention incorporates a microphone 31 which is connected directly to an amplification and filter circuit 40 which receives the audible messages enunciated by the user and assures that the message is properly transmitted to storage addresses 36 for retention therein. In addition, the system contains an amplifier 37 which, in turn, is connected to speaker 32. In this way, any information retained in storage address 36 is easily retrieved therefrom, when desired, and transmitted to speaker 32 for being heard by the user.

The final element incorporated into the circuitry of the preferred embodiment of the present invention is tape extension sensor 38. As discussed above, when record/play selector 26 is placed in the record mode, the removal of measuring tape 22 from housing 21 automatically activates the circuitry into the ON mode. In this embodiment, tape extension sensor 38 is mounted in conjunction with measuring tape 22 and is activated to transmit a signal whenever measuring tape 22 is removed from housing 21. The signal from sensor 38 is transmitted to controller 35, causing controller 35 to activate the system and enable the system to be ready to receive and record any messages desired by the user.

In addition to construction changes or alterations that may be made to the circuitry or the structure of the preferred embodiment of the present invention, the present invention may also be implemented in a distance measuring device which uses sound waves or light waves to determine the distance to be measured. Typically, these prior art systems transmit a sound wave or light beam to a remote surface and, based upon the reflected signal, determines the distance between the measuring device and the surface being measured. This information is then transmitted to a digital readout. By employing the teaching of the present invention, the user operates the system while audibly stating the measurement displayed on the digital readout. In this way, the measured distance is transmitted to the desired storage address. Once all of the desired measurements have been taken, the recorded information is retrieved, when needed, and transmitted to the speaker for being heard and used.

In the foregoing detailed disclosure, the construction of the audio recording and tape measuring system of this invention has been fully detailed. In addition, alternate embodiments and constructions have been discussed as a part of this detailed disclosure. However, in order to assure a full, complete understanding of the present invention, the overall operation of the preferred embodiment of the present invention is detailed below.

In the typical use of the present invention, the user positions play/record selector switch 26 in the RECORD position prior to employing audio recording and tape measuring system 20 for measuring any desired length. When switch 26 is positioned in the RECORD mode, audio recording and tape measuring system 20 is in its OFF mode, with an open circuit existing between the power source and the electronic circuit. In this way, power can be preserved when system 20 is not in use.

Whenever any desired length needs to be measured, the user withdraws measuring tape 22 from housing 21, in the conventional manner, securing the distal end of measuring tape 22 at one position and extending housing 21 to the second position with the sufficient length of measuring tape 22 being exposed so the desired measurement can be accurately determined. Upon removal of measuring tape 22 from housing 21, tape extension sensor 38 is activated and transmits an activation signal to controller 35. In response to this signal, controller 35 activates the entire system into the ON mode, effectively connecting the power means to the circuitry. This assures that the system is ready for receiving and recording any audible message.

Once the user has accurately determined the first measurement to be taken, the user merely presses one of the address selector switches 27, 28, 29, or 30 and audibly enunciates the desired message to be recorded. The activation of one of the switches 27, 28, 29 or 30 transmits the appropriate signal to controller 35 which initiates the RECORD mode, while simultaneously receiving and recording the audible message delivered to microphone 31.

The signal received by microphone 31 is transmitted by controller 35 to storage address 36 and retained therein for access by pressing the particular address selector switch employed by the user for storage. This recording process continues until all of the available storage address space in the particular storage address is filled or the user removes the activation pressure from the selector switch.

If any additional measurements are to be recorded, the same process is employed with the user, preferably employing another address selector switch to assure that the storage address is not filled and information is not lost. By providing, four separate and independent addresses in storage address 36, the ability to record numerous measurements in their entirety is assured and the capability of any individual to employ this system and completely record measurements in virtually any desired application is provided.

Once all of the desired measurements have been fully recorded, measuring tape 22 is automatically returned to its fully stowed position in housing 21. The return of measuring tape 22 to housing 21 deactivates tape extension sensor 38, causing the power to the circuitry to be turned OFF, in order to conserve battery power.

Whenever the user is ready to employ the measurements that have been recorded in storage address 36, the user moves slide switch 26 from the RECORD position to the PLAY position. This signal is transmitted to controller 35 in order to initiate the PLAY mode. In addition, in the preferred embodiment, the selection of the PLAY mode also simultaneously connects power to the circuitry in order to properly operate the circuitry. If desired, alternate battery activation systems can be employed, without departing from the scope of this invention. However, power activation in this manner has been found to be most desirable.

With selector switch 26 in the PLAY position and power to the circuitry turned ON, the user merely presses one of the address selector buttons 27, 28, 29, or 30 in order to obtain the information that has been stored in the address corresponding to that particular selector switch. For example, if the desired measurements have been stored by pressing address selector button 27, the user would press address selector button 27, causing controller 35 to retrieve the information retained in storage address 36 corresponding to selector switch 27.

Once button 27 has been pressed, controller 35 accesses the appropriate storage address 36, causing the analog information stored therein to be transmitted back to controller 35. Controller 35 then transmits the signal to amplifier 37 and speaker 32, so that the recorded information is audibly transmitted for being heard by the user. Once all of the information in the selected storage address 36 has been audibly transmitted through speaker 32, the system is placed in a STOP mode.

By repeating the same process, the user is able to access and obtain audible transmissions corresponding to the information stored in each of the other storage addresses 36. As detailed above, this process is easily attained by the user merely pressing the appropriate address selector button corresponding to the storage address within which the desired information is stored. Once an appropriate address selector button has been pressed, the corresponding information is transmitted from storage address 36 to controller 35, which then causes the information to be transmitted to amplifier 37 and to speaker 32 for being heard by the user.

Once the user has had all of the stored information audibly enunciated through speaker 32 for the user's convenience, record/play selector switch 26 is preferably returned into the RECORD mode for effectively switching power from the ON mode to the OFF mode. In this way, battery power is preserved and longer term use of the system is realized.

As discussed above, the construction detailed herein is the preferred embodiment for attaining a highly effective and easily employable audio recording and tape measuring system. However, numerous structural changes as well as electronic circuitry changes can be made to the present invention without departing from the scope of this invention. Consequently, it is to be understood that the particular embodiments detailed above are considered as preferred examples of the present invention and are not intended as limiting the present invention to these embodiments.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, that I claim as new and desire to secure by Letters Patent is:

1. An audio signal recording and distance measuring system for enabling any desired information to be recorded for later replay and use, said system comprising
   A. a housing;
   B. distance measuring means mounted in the housing and comprising an elongated measuring tape extendable from the housing for use in determining any desired measurement; and
   C. an audio signal recording circuit mounted in the housing and constructed for receiving and recording audio information, and replaying the recorded information upon demand in response to an activation signal generated by a tape extension sensor;
   whereby an easily usable multi-purpose system is attained which enables distances to be measured and the measured distance recorded and audibly replayed when desired.

2. The audio signal recording and distance measuring system defined in claim 1, wherein said audio signal recording circuit is further defined as comprising:
   a. circuit controlling and processing means,
   b. an information storage address connected to the controlling and processing means for receiving and retaining analog signals transmitted thereto;
   c. a microphone for receiving audible information and transmitting the audible information to the circuit controlling processing means for transmission to the storage address;
   d. output means connected to the circuit controlling and processing means for receiving signal transmissions from the storage address and transmitting the received signals to a speaker for audibly delivering the retrieved signal for being heard by a user, and
   e. a mode selector switch connected to the circuit controlling and processing means for selecting a RECORD mode or a PLAY mode, enabling the circuit controlling processing means to either store information in the storage address or transmit stored information out of the storage address for audible presentation.

3. An audio recording and tape measuring system for enabling the measurement of distance using a measuring tape and enabling the measurements to be orally enunciated and recorded for later use, said system comprising
   A. a housing
   B. a measuring tape securely mounted in the housing for being removed therefrom, whenever desired, to any desired length to enable measurements of distances to be made; and
   C. an audio signal recording circuit mounted in the housing and constructed for receiving and recording audible information and replaying the recorded information upon demand, said circuit comprising
      a. circuit controlling and processing means,
      b. an information storage address
         1. controllably interconnected to the controlling and processing means for receiving signals corresponding to orally enunciated information,
         2. storing said signals therein, and
         3. transmitting, upon demand, stored signals to the circuit controlling and processing means,
      c. a microphone connected to the circuit controlling and processing means and constructed for
         1. receiving an orally enunciated signal corresponding to the desired information to be recorded, and
         2. transmitting the signal to the controlling and processing means for transmission to and retention in the storage address,
      d. output means connected to the circuit controlling and processing means for receiving signals retrieved from the storage address and presenting the stored information as an audible signal corresponding to the stored information, and
      e. a mode selector switch connected to the circuit controlling and processing means and movable between a RECORD mode and a PLAY mode, enabling the circuit controlling and processing means to establish the desired operation of the recording circuit.

4. The audio recording and tape measuring system defined in claim 3, wherein the output means is further defined as comprising an amplifier and a speaker constructed for receiving the recorded information signal from the circuit controlling and processing means and delivering an audible output signal corresponding to the stored information.

5. The audio recording and tape measuring system defined in claim 3, wherein said system is further defined as comprising
   D. at least one activation switch mounted to the housing for ease of access by the user and constructed for transmitting an activation signal to the circuit controlling and processing means for initiating the operation of the audio signal recording circuit in the selected mode.

6. The audio recording and tape measuring system defined in claim 5, wherein said circuit controlling and processing means is further defined as being responsive to the receipt of the activation signal for initiating the recording of orally enunciated information when the mode selector switch is in the RECORD position and initiating the retrieval of stored information from the storage address for transmission to the output means when the mode selector switch is in the PLAY position.

7. The audio recording and tape measuring system defined in claim 5, wherein said information storage address is further defined as comprising a plurality of separately accessible information storage addresses.

8. The audio recording and tape measuring system defined in claim 7, wherein said system is further defined as comprising a plurality of activation switches with each of said activation switches being associated with one information storage address, thereby enabling the selection of a particular address for either recording of information therein or retrieval of information therefrom.

9. The audio recording and tape measuring system defined in claim 8, wherein said system is further defined as comprising four separate and independent activation switches and four separate and independent storage addresses.

10. The audio recording and tape measuring system defined in claim 8, wherein each of the storage addresses is further defined as being capable of recording audio information for between about five seconds and thirty seconds.

11. The audio recording and tape measuring system defined in claim 3, wherein said system is further defined as comprising D. a tape extension sensor connected to the audio signal recording circuit and cooperatively associated with the measuring tape for transmitting a power ON signal to the audio signal recording circuit whenever the measuring tape has been removed from the housing.

12. The audio recording and tape measuring system defined in claim 11, wherein said audio signal recording circuit is further defined as being powered by replaceable battery means.

13. The audio recording and tape measuring system defined in claim 12, wherein said sensor is further defined as transmitting a switch closure signal upon removal of the measuring tape for effectively connecting the battery means to the audio signal recording circuit, thereby powering the circuit for operation.

14. The audio recording and tape measuring system defined in claim 11, wherein said mode selector switch is further defined as transmitting a power ON signal whenever said switch is placed in the PLAY mode.

15. The audio recording and tape measuring system defined in claim 11, wherein said system further comprises adjustment means for increasing the volume of the audibly delivered signal.

16. An audio recording and tape measuring system for enabling the measurement of distance using a measuring tape and enabling the measurements to be orally enunciated and recorded for later use, said system comprising A. a housing B. a measuring tape securely mounted in the housing for being removed therefrom, whenever desired, to any desired length to enable measurements of distances to be made; and C. an audio signal recording circuit mounted in the housing and constructed for receiving and recording audible information and replaying the recorded information upon demand, said circuit comprising a. circuit controlling and processing means, b. an information storage address 1. controllably interconnected to the controlling and processing means for receiving signals corresponding to orally enunciated information, 2. incorporating a plurality of independent storage zones, 3. constructed for storing said signals in one of said zones, and 4. transmitting, upon demand, stored signals to the circuit controlling and processing means, c. a microphone connected to the circuit controlling and processing means and constructed for 1. receiving an orally enunciated signal corresponding to the desired information to be recorded, and 2. transmitting the signal to the controlling and processing means for transmission to and retention in the storage address, d. output means connected to the circuit controlling and processing means for receiving signals retrieved from the storage address and presenting the stored information as an audible signal corresponding to the stored information, e. a mode selector switch connected to the circuit controlling and processing means and movable between a RECORD mode and a PLAY mode, enabling the circuit controlling and processing means to establish the desired operation of the recording circuit, and f. replaceable battery means for providing the requisite power to the circuit;

D. a tape extension sensor connected to the audio signal recording circuit and cooperatively associated with the measuring tape for transmitting a power ON signal to the audio signal recording circuit whenever the measuring tape has been removed from the housing; and E. a plurality of activation switches a. mounted to the housing for ease of access by the user, b. constructed for transmitting an activation signal to the circuit controlling and processing means for initiating the operation of the audio signal recording circuit in the selected mode, and c. each associated with one information storage zone of the storage address for enabling the selection of a particular zone for recording of information or retrieval of information.

* * * * *